(12) United States Patent
Shinchi et al.

(10) Patent No.: US 10,499,122 B2
(45) Date of Patent: Dec. 3, 2019

(54) SENSOR UNIT, HOST DEVICE AND DATA COMMUNICATION METHOD THEREBETWEEN

(71) Applicants: KOHSHIN ELECTRIC CORPORATION, Kasaoka, Okayama (JP); DIGIAN TECHNOLOGY INC., Yokohama, Kanagawa (JP)

(72) Inventors: Nobuyuki Shinchi, Kasaoka (JP); Yoshiaki Shinohara, Yokohama (JP)

(73) Assignees: KOHSHIN ELECTRIC CORPORATION, Kasaoka, Okayama (JP); DIGIAN TECHNOLOGY INC., Yokohama, Kanagawa (JP)

( * ) Notice: Subject to any disclaimer, the term of this patent is extended or adjusted under 35 U.S.C. 154(b) by 973 days.

(21) Appl. No.: 14/660,822

(22) Filed: Mar. 17, 2015

(65) Prior Publication Data

US 2015/0281808 A1    Oct. 1, 2015

(30) Foreign Application Priority Data

Mar. 28, 2014 (JP) .................................. 2014-070330
Feb. 28, 2015 (JP) .................................. 2015-039682

(51) Int. Cl.
  *H04Q 9/00*   (2006.01)
(52) U.S. Cl.
  CPC ........................... *H04Q 9/00* (2013.01)
(58) Field of Classification Search
  None
  See application file for complete search history.

(56) References Cited

U.S. PATENT DOCUMENTS

| 5,805,466 A | 9/1998 | Roeckner et al. |
| 6,968,484 B2 | 11/2005 | Hummel |
| 7,586,430 B2 | 9/2009 | Engl |
| 7,982,483 B2 | 7/2011 | Scherr |

(Continued)

FOREIGN PATENT DOCUMENTS

| JP | 63-013509 A | 1/1988 |
| JP | 63-245599 A | 10/1988 |

(Continued)

*Primary Examiner* — David M. Gray
*Assistant Examiner* — Geoffrey T Evans
(74) *Attorney, Agent, or Firm* — patenttm.us (57) ABSTRACT

To provide a compact, high density, highly reliable and low cost three-terminal IC sensor unit, a host device to be connected to the sensor unit, a sensor system comprising such sensor unit and host device and a communication method between sensor unit and host device. The power supply voltage to be supplied to the sensor unit 100 from the host device (external device) 200 through the power supply terminal 101 is turned on/off by power supply on/off means 220 in response to command and/or data to be transmitted and such on/off pulsation of the power supply voltage is detected by the data detection section 140 for transmission from the host device 200 to the sensor unit 100. Also, the current source 160 in the sensor unit 100 varies the load current of the power supply in the host device 200 through the power supply terminal 101 in response to the data and the change in the load current is detected by the current detection section 230 for data transmission from the sensor unit 100 to the host device 200.

2 Claims, 5 Drawing Sheets waveforms and internal operation in communication mode (56) References Cited

U.S. PATENT DOCUMENTS

| | | | | |
|---|---|---|---|---|
| 2010/0114258 A1* | 5/2010 | Donofrio | ................ | A61N 1/37 |
| | | | | 607/63 |
| 2015/0115809 A1* | 4/2015 | Siessegger | ......... | H05B 33/0803 |
| | | | | 315/185 R |
| 2015/0295496 A1* | 10/2015 | Chen | ....................... | H02M 1/32 |
| | | | | 363/21.18 |

FOREIGN PATENT DOCUMENTS

| | | |
|---|---|---|
| JP | 06-058834 A | 3/1994 |
| JP | 4244886 B2 | 1/2009 |
| JP | 4309082 B2 | 5/2009 |
| JP | 2010-122184 A | 6/2010 |
| JP | 4598206 | 10/2010 |

\* cited by examiner

FIG. 4 operation after power-on in nomal operation mode waveforms and internal operation in communication mode

SENSOR UNIT, HOST DEVICE AND DATA COMMUNICATION METHOD THEREBETWEEN

FIELD OF THE INVENTION

The present invention relates to a sensor system, more specifically to a sensor system comprising a sensor unit (sub-device) and a host device that need communication therebetween, the sensor unit and the host device of such sensor system and a data communication method between the sensor unit and the host device.

BACKGROUND OF THE INVENTION

Sensor units are widely used for detecting physical quantities (such as, for example, temperature, current, pressure, strain or the like) of various objects to be detected. For example, vehicles such as passenger cars or the like are generally equipped with one or more microprocessors (MPUs) for electronically controlling various parts in order to improve their performance and/or efficiency and reliability. Precisely, electronically controlled in passenger cars are not only engine controls such as timings of fuel injection, ignition and pressure inside cylinders but also open/close operation of doors, angle adjustments of back mirrors, etc.

In such electronic controls, when instructions or commands are outputted from such MPU, it is necessary to confirm actual operations by feeding back to the MPU whether electrical signals are properly supplied to motors or actuators or any malfunctions are caused. For this end, passenger cars or the like are typically equipped with a plurality of sensor units to detect physical quantities such as, for example, the magnitude of electrical currents flowing through various conductors as well as temperatures or the like to affect their operations.

Generally, sensor units are manufactured as unitary units by integrating sensors (for example, Hall elements) for detecting current, temperature, pressure or the like) and associated electronic circuits using semiconductor integrated circuit (IC) technologies in order to reduce manufacturing cost and improve reliability. Moreover, in order to achieve miniaturization and high density of such sensor units, it is preferable or essential that such sensor units are operable with lower power supply voltage and have minimum number of terminals, i.e., only three terminals (power terminal, ground terminal and signal output terminal) for interconnection with external devices. It is also typical that such sensor units have no internal power supply but are designed to receive operation power supply voltage from outside through their power supply terminals.

Most sensors, for example, Hall elements are not only affected by external temperature, pressure, strain or the like but also have aging characteristics (i.e., degradation due to hours of operation) no exception. Especially, those integral sensors manufactured using IC technologies tend to be largely affected by external conditions and have larger aging characteristics because they are manufactured by densely packing a plurality of parts and components. In order to minimize such adverse effects and providing stable detection signal from such sensor units, it is necessary to provide correction or calibration means and memories (for example, nonvolatile memories) for properly calibrating detection signals from the sensors based on the correction data pre-stored in such memories.

Proposed are techniques for writing data in a nonvolatile memory of an IC sensor unit including a sensor and a nonvolatile memory and reading such data from an external host device. An integrated circuit arrangement is disclosed to supply a voltage level (for example, +8V) that is sufficiently higher than the normal operating voltage (for example, +5V) to the power supply terminal for parameterize the IC (see, for example, Patent Document 1 and Patent Document 2 below). Also disclosed are component communication circuit and method for externally inputting a trigger pulse in superimposed with a power supply voltage to a power supply terminal for supplying an operation voltage and detecting a data superimposed with its analog output signal from its output terminal using a data detector (see, for example Patent Document 3 below). Also disclosed are an IC having a mixed signal single wire and a method of operating the same, wherein the IC comprises a power supply terminal, a ground terminal and an output terminal to enable selectively outputting an analog signal and a control signal from the output terminal based on a control signal from an additional terminal (see, for example, Patent Document 4 below). Furthermore, disclosed are signal calibration device and method including a sensor, a signal processor and a data storage for storing a correction data to be entered into the processor, and having three terminals of a power terminal, a ground terminal and an output terminal, for enabling to write a calibration data into the data storage from the output terminal together with an output signal from the sensor (see, for example, Patent Document 5 below).

Also disclosed are inertia velocity sensor and method having a power supply terminal and an output terminal and including built-in test means for conditioning such as a programming mode or the like by way of a path other than the output terminal (see, for example, Patent Document 6 below).

PRIOR ART DOCUMENTS

Patent Documents

[Patent document 1] U.S. Pat. No. 6,968,484
[Patent Document 2] Japanese patent no. 4598206
[Patent document 3] U.S. Pat. No. 7,982,483
[Patent Document 4] U.S. Pat. No. 7,586,430
[Patent Document 5] U.S. Pat. No. 5,805,466
[Patent Document 6] Japanese patent no. 4309082
[Patent Document 7] Japanese patent no. 4244886

SUMMARY OF THE INVENTION

Problems to be Solved by the Invention

However, the conventional technologies as referred hereinabove have the following problems. That is, in order to switch control the power supply voltage to be supplied to the power supply terminal to a sufficiently higher voltage than its normal operation voltage, the IC must be designed to have higher withstand voltage, thereby making it difficult to obtain high density (or miniaturization) and low cost sensor units. Also, in order to detect an operation mode and data based on the voltage level of the sensor unit, it is most likely to cause malfunction due to noise or the like included in the power supply voltage, thereby making it difficult to achieve highly reliable operation. Moreover, in order to transmit data and signals over a plurality of terminals such as the power terminal and the output terminal, the circuit configuration tends to be very complicated. Furthermore, provision of an additional control terminal other than the three terminals of power, ground and output terminals makes it very difficult to achieve high density and low cost IC.

The present invention was made in consideration of the aforementioned problems associated with the conventional technologies. It is therefore an object of the present invention to provide a sensor unit having a simple, compact and low cost construction and yet highly reliable performance, a host device to be used with such sensor unit, an improved sensor system comprising such sensor unit and host device, and a data communication method between the sensor unit and the host device.

Means to Solve the Problems

In order to solve the above problems and achieve the above object, the sensor unit according to the present invention employs the following unique construction. That is, the sensor unit of the present invention is a three terminal integrated circuit (IC) construction including a sensor and having a power terminal to receive a power supply voltage, a ground terminal and a signal output terminal for outputting a signal detected by the sensor, and characterized in comprising receiving means for receiving information sent from the outside by turning on/off the power supply voltage through the power supply terminal and a rectifier circuit to rectify the power supply voltage of the power supply terminal for obtaining an operation power supply voltage of the receiving means.

Wherein, the rectifier circuit includes a smoothing circuit (filter) having a time constant longer than the off time of the on/off power supply voltage. The maximum voltage of the on/off power supply voltage is equal to the normal operation voltage of the sensor unit. The sensor unit further comprises a nonvolatile memory for storing the information received by the receiving means. The power supply voltage is on/off controlled by an outside host device connected to the power supply terminal and the ground terminal. Transmission of information to the sensor unit from the outside by turning on/off the power supply voltage is carried out digitally by varying the on/off times (pulse width) in response to [0] and [1] of the information to be sent. Information for defining the pulse width of the on/off power supply voltage corresponding to [0] and [1] is sent to the sensor unit from the outside in advance. The sensor unit further comprises a calibration section for outputting the calibrated detection signal from the output terminal by correcting the detection signal of the sensor in response to the data stored in the nonvolatile memory. Moreover, the sensor unit further comprises a current source for varying the load current of the power supply for supplying the power supply voltage through the power supply terminal, thereby transmitting the data stored in the nonvolatile memory to the outside upon request from the outside.

Also, the sensor unit of the present invention has the following unique construction. That is, the sensor unit is a three terminal IC having a power supply terminal, a ground terminal and a signal output terminal and including a sensor, a calibration section for outputting a calibrated output signal by correcting the detection output of the sensor, a data detection section and a nonvolatile memory, characterized in further comprising a rectifier circuit for rectifying on/off pulsation of the power supply voltage to be supplied from the outside through the power supply terminal and a current source for varying the load current of a power supply to supply the power supply voltage through the power supply terminal, wherein the rectifier circuit supplies its rectified voltage to the data detection section as its operation power supply voltage, the data detection section detects the data transmitted from the outside by turning on/off the power supply voltage, and the current source transmits the data stored in the nonvolatile memory by varying the load current of the power supply upon request from the outside.

Wherein, the maximum on-time voltage of the on/off power supply voltage supplied from the outside through the power supply terminal is equal to the normal operation voltage. In order to transmit data to the sensor unit from the outside, the on/off times (pulse widths) of the power supply voltage are varied in response to [0] and [1] of the data to be transmitted.

On the other hand, the host device of the present invention is a device to be connected to the power supply terminal and the ground terminal of the sensor unit for initializing or maintenance thereof and has the following unique construction. That is, the host device comprises a power supply to supply the operation power supply of the sensor unit through the power supply terminal, power supply on/off means for turning on/off the power supply voltage from the power supply, a current detection section for detecting the change of the load current of the power supply by the sensor unit and a data detection section for detecting data by converting the change of the load current detected by the current detection section into digital data.

Wherein, power supply on/off means of the host device unit controls the on/off times (pulse widths) of the power supply voltage in order to transmit command and/or data to the sensor unit. Also, the host device comprises a plurality of signal terminals for connecting signal output terminals of a plurality of sensor units and selection means for selecting such plurality of sensor units.

Moreover, the sensor system of the present invention employs the following unique construction. That is, the sensor system comprises the aforementioned sensor unit and the aforementioned host device, and the host device is connected, if necessary, to the power supply terminal and the ground terminal of the aforementioned sensor unit for transmission of information between the host device and the sensor unit.

Wherein, a plurality of sensor units are connected simultaneously for operating such plurality of sensor unit by sequentially selecting.

Furthermore, the data communication method between the sensor unit and the host device of the present invention employs the following unique construction. That is, the data communication method performs data communication between a three-terminal IC sensor unit including a sensor and having three terminals of power supply, ground and signal output terminals and a host device connected to the power supply and ground terminals of the sensor unit and supplying power supply voltage through the power supply terminal of the sensor unit, wherein command and/or data is transmitted from the host device to the sensor unit by turning on/off the power supply of the host device to be supplied through the power supply terminal, and data is transmitted from the sensor unit to the host device by varying the load current of the power supply of the host device through the power supply terminal.

Wherein, the sensor unit obtains operation power supply voltage for the data detection section by rectifying the on/off pulsating voltage of the power supply to be supplied from the host device. In advance to transmission of the command and/or data by turning on/off the power supply to be supplied from the host device, the power supply is turned on/off for a predetermined number of times for preparation of receiving command and/or data by the sensor unit. Moreover, data transmission between the host device and the sensor unit by turning on/off the power supply or varying the load current of the power supply is performed by varying widths of the on/off pulse of the power supply voltage and the change of the load current of the power supply. A plurality of sensor units may be connected to the host device for sequentially selecting such sensor units by the host device.

Advantages of the Invention

According to the sensor unit of the present invention, the sensor unit can be made in a low cost, compact and high density IC because it contains no power supply, is in a minimum three-terminal construction of power supply, ground and signal output terminals and the power supply voltage to be applied to the power supply terminal does not exceed its normal operation voltage (e.g., +5V) in any operation modes. Additionally, instead of on/off pulsating the power supply voltage in case of communication with the outside, the rectifier circuit provides the operation voltage for the data detection section by rectifying the on/off pulsating voltage, thereby guaranteeing normal operation of the data detection section.

The host device of the present invention communicates by turning on/off the power supply voltage to supply through the power supply terminal, thereby enabling to effectively avoid malfunctions due to noise or the like unavoidably included in most power supply. Moreover, not only turning on/off the power supply voltage but also by controlling on/off times (on/off pulse widths) for data transmission, it is possible to achieve more reliable operation with no influence of noise or the like.

Data transmission from the sensor unit to the host device is made using a current source in the sensor unit that varies the load current of the power supply and the resulting changes in the load current are detected by the current detection section in the host device, thereby achieving simple and yet reliable communication from the sensor unit to the host device through only the power supply terminal. In other words, bi-directional communication can be made if necessary not only from the outside (host device) to the sensor unit but also from the sensor unit to the outside (host device) through the power supply terminal.

Moreover, if necessary, a plurality of sensor units can be connected simultaneously to the host device for efficiently carrying out initialization, renewal or the like by sequentially selecting such sensor units. As a result, it is possible to significantly improve operation efficiency, manufacture of the sensor units at a low cost and perform efficient maintenance.

BRIEF DESCRIPTION OF DRAWINGS

FIGS. 5A-5C show timing charts to illustrate the operation of the sensor system of the present invention, wherein

EMBODIMENTS OF THE INVENTION

Now, embodiments of the sensor unit, the host device to be used therewith, the sensor system comprising the sensor unit and the host device and the data communication method between sensor unit and host device of the present invention will be described hereunder in detail by reference to the accompanying drawings. It is to be noted, however, that the embodiments as disclosed herein are nothing but examples of the present invention and not for the purpose of restricting the present invention.

Figure 1:
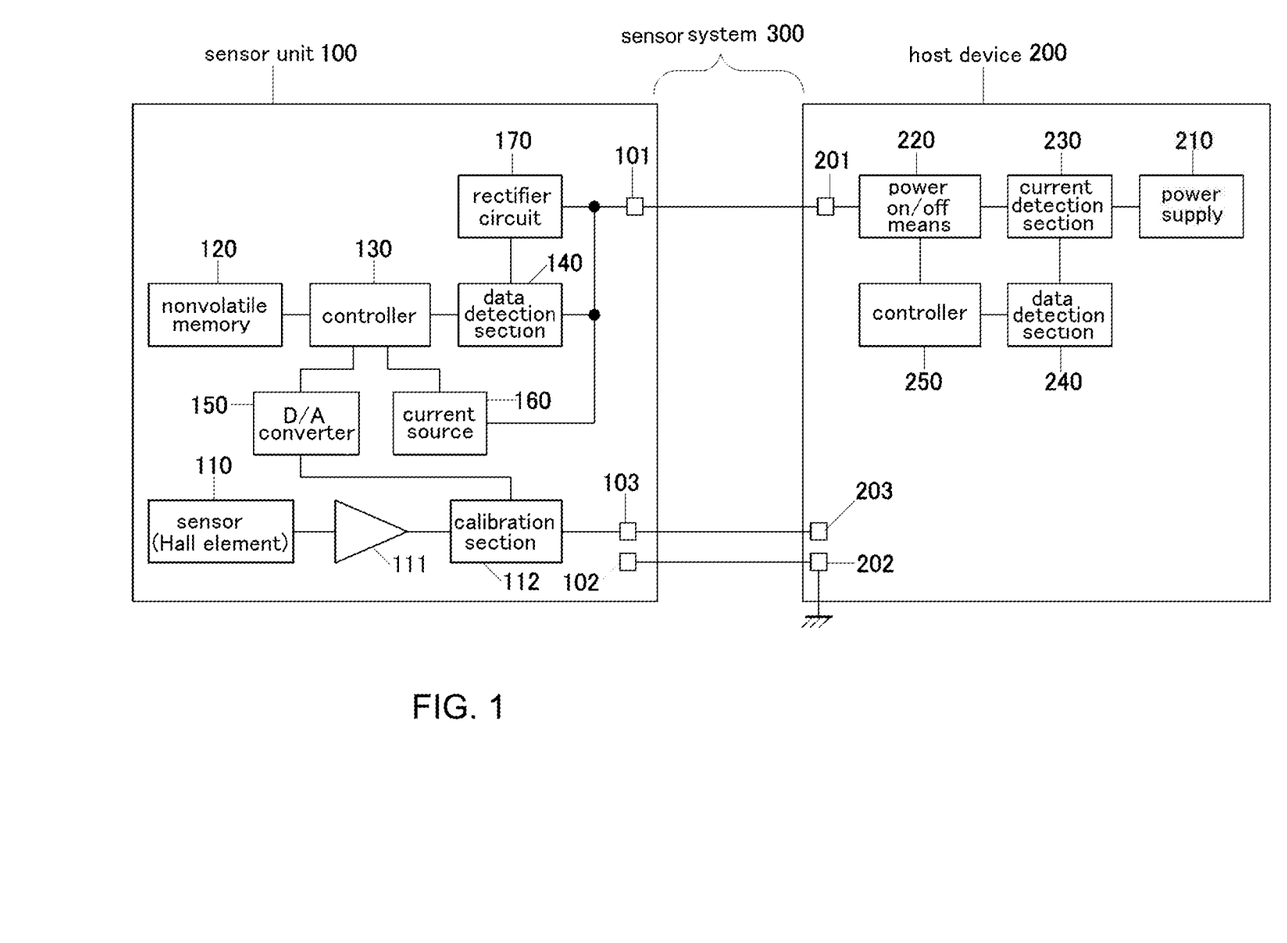
FIG. 1 is a functional block diagram to illustrate the fundamental construction of the sensor unit and the host device constituting the sensor system of the present invention.

Firstly, FIG. 1 is a functional block diagram to illustrate the fundamental construction of the sensor system of the present invention comprising a sensor unit 100 and a host device 200 to cooperate by interconnecting them. The sensor unit 100 is designed for installation or assembling at a suitable location in an object to be detected (for example, a vehicle), preferably in a removable manner, for detecting its physical quantity (such as, for example, current through a control signal conductor). Prior to installation of the sensor unit 100 in such object, the sensor unit 100 is connected with the host device 200 for initializing the sensor unit 100 such as entry of necessary data, confirmation of its detection signal or the like. Also, when the sensor unit 100 is removed from the object to be detected for maintenance, renewal or other purposes, the sensor unit 100 is connected to the host device 200 for performance check or the like.

The construction of the sensor unit 100 is first described. The sensor unit 100 is preferably manufactured as a unitary member using semiconductor integrated circuit (IC) technologies and has the minimum number of terminals for connection with an external device, i.e., three terminals of a power supply terminal 101, a ground terminal 102 and a signal output terminal 103. The sensor unit 100 comprises a sensor 110, an amplifier 111, a calibration section 112, a nonvolatile memory 120, a controller 130, a data detection section 140, a digital-to-analog (D/A) converter 150, a current source 160 and a rectifier circuit 170.

Then, primary functions of the aforementioned constituting elements 110~170 of the sensor unit 100 will be described. The sensor 110 is an element for detecting physical quantity of the object to be detected and is, for example, a Hall element for detecting magnetic field intensity or magnetic flux, a temperature sensor for detecting temperature, a pressure sensor for detecting pressure, a distortion sensor for detecting distortion or strain, or the like. The amplifier 111 amplifies a small detection signal from the sensor 110 to desired amplitude. The calibration section 112 calibrates the output signal from the amplifier 111 for providing accurate physical quantity before outputting from the signal output terminal 103 based on ambient temperature, aging characteristics, nonlinear property and the like.

The nonvolatile memory 120 stores various necessary data associated with the sensor 110 to be used in the sensor unit 100 such as, for example, date of manufacture, serial number, aging characteristics, temperature property and the like. The data detection section 140 detects command and/or data that is transmitted from an external device such as the host device 200 through the power supply terminal 101. The controller 130 is disposed between the nonvolatile memory 120 and the data detection section 140 for writing the data into the nonvolatile memory 120 in response to the command detected by the data detection section 140, outputting desired data stored in the nonvolatile memory 120 to the D/A converter 150, or controlling operation (for example, on/off operation) of the current source 160. The rectifier circuit 170 rectifies the pulsation due to on/off operation of the g power supply voltage to be supplied from the host device 200 through the power supply terminal 101 and the rectified voltage is supplied to the data detection section 140 as its operation voltage.

Now, the entire operation of the sensor unit 100 will be described. Whenever needs arise, the sensor unit 100 is connected to the host device 200 that will be described in detail hereinafter and receives the necessary operation power supply voltage from the host device 200 through the power supply terminal 101. The supplied power supply voltage is used as operation power supply voltage for the sensor 110, the amplifier 111, the calibration section 112, the nonvolatile memory 120, the controller 130, the D/A converter 150, the current source 160 and the rectifier circuit 170. When the power supply voltage from a power supply in the host device 200 will be on/off pulsated as will be described hereinafter, the rectifier circuit 170 supplies a constant operation power supply voltage for the data detection section 140 by rectifying and smoothing the pulsating power supply voltage. The data detection section 140 detects command and/or data that is transmitted from the host device 200 by turning on/off the power supply voltage from the host device 200.

In response to the command and/or data detected by the data detection section 140, the controller 130 writes data in the nonvolatile memory 120 and reads out the necessary data stored in the nonvolatile memory 120 for outputting to the D/A converter 150 and the current source 160. If the sensor 110 is, for example, a Hall element for detecting current (magnetic flux), the calibration section 112 provides necessary calibration data in response to the operation time of the sensor 110, the ambient temperature where the sensor is used (as detected by a built-in temperature sensor that is not shown in the drawing) and the like, thereby enabling the amplifier 111 to output the accurate detection signal from the signal output terminal 103. It is to be noted that information for the operation time of the sensor 110 can be obtained from a built-in timer, for example, a clock that will be described hereinafter by reference to FIG. 2.

Now, it is to be noted that the output of the sensor 110 is calibrated in an analog manner in the embodiment as described hereinabove by reference to FIG. 1 by the calibration section 112 after converting the read-out data from the nonvolatile memory 120 into an analog signal by the D/A converter 150. However, if the output of the sensor 110 is converted into a digital data using an analog-to-digital (A/D) converter (not shown), it is possible to calibrate in a digital manner using the digital data read out of the nonvolatile memory 120. In such case, the D/A converter 150 is no longer needed.

The current source 160 is controlled by the controller 130 to read the data in response to commands transmitted from the host device 200 through the power supply terminal 101, thereby varying the load current of the power supply that supplies the power supply voltage through the power supply terminal 101. By detecting the change in the load current of the power supply, the host device 200 is capable of acquiring necessary information such as, for example, serial number of the sensor 110, hours of operation of the sensor 110, or the like from nonvolatile memory 120.

It is to be noted here that the operation power supply voltage to be supplied from the host device 200 to the sensor unit 100 is a constant normal operation voltage (for example, +5V) and the power supply voltage is pulsated only when communicating with the sensor unit 100. And the sensor unit 100 communicates with the host unit 200 by varying the load current of the power supply through the power supply terminal 101, i.e., transmits the data stored in the nonvolatile memory 120 to the host device 200. In other words, the sensor unit 100 and the host device 200 make bi-directional communication, i.e., send and receive commands and/or data through the power supply terminal 101 (from the host device 200 to the sensor unit 100 by turning on/off the power supply voltage, while from the sensor unit 100 to the host device 200 by varying the load current of the power supply). Moreover, as will be described hereinafter, it is possible to significantly improve operation reliability and stability by designing the data detection section 140 to detect data based on the change in the on/off periods, i.e., pulse width (rather than the voltage level) of the operation power supply voltage to be supplied from the host device 200 to the sensor unit 100 through the power supply terminal 101. generally, the power supply voltage is unavoidably fluctuate due to various conditions and contains noise. However, on/off periods of the power supply can be controlled in high precision. Similarly, it is also possible to precisely control time period of varying the load current (for example, on/off time period) of the power supply by the current source 160.

Additionally, as will be described hereinafter by reference to FIG. 2, the data detection section 140 in the sensor unit 100 of the present invention is driven by the voltage from the rectifier circuit 170 that rectifies the power supply voltage supplied through the power supply terminal 101 and outputs such voltage to a power supply bus 174. A diode 171 in the rectifier circuit 170 is turned on when the power supply voltage through the power supply terminal 101 pulsates or turned on and charges a capacitor 172. The capacitor 172 is charged during on periods of the power supply voltage through the power supply terminal 101 and discharges during off periods. And the diode 171 prevents the charged voltage of the capacitor 172 from causing reverse flow toward the power supply terminal 101. The charged voltage of the capacitor 172 is stabilized by a regulator 173 before being supplied to the operation power supply voltage for the date detection section 140 through the power supply bus 174. Since an OSC 180 is monitoring periods of varying the power supply voltage on the power supply terminal 101, it is possible to power down the data detection section 140 if the power supply voltage does not pulsate for a time longer than a predetermined time or duration. When power down of the data detection section occurs once, the power supply is turned off for longer than a predetermined time to allow the capacitor 172 to discharge. When the power is turned on thereafter, the data detection section 140 is initialized (reset) by a power-on reset (POR) 181 for monitoring on/off pulsation of the power supply voltage, thereby ensuring operation of the data detection section 140.

Now, description will be made on the host device 200 that is suitably connected to the sensor unit 100 to cooperate with each other as a sensor system 300 of the present invention. The host device 200 is provided with a power supply terminal 201, a ground terminal 202 and an output signal terminal 203. Also, the host device 200 comprises as primary constituent elements a power supply 210, on/off means of the power supply voltage 220, a current detection section 230, a data detection section 240 and a controller 250 for controlling the operation of the power supply on/off means 220.

Primary functions of each of the constituent elements 210~250 will be described. The power supply (or battery) 210 not only supplies operation power supply voltage to each element of the host device 200 and but also supplies operation power supply voltage that is required by the aforementioned sensor unit 100 by connecting it to the power supply terminal 201 by way of power supply on/off means 220. The current detection section 230 is preferably connected between the power sully 210 and power supply on/off means 220 for detecting any change in the load current of the power supply 210. The data detection section 240 is connected to the current detection section 230 for detecting data based on the change (pulsation) in the load current of the power supply due to the current source 160 in the aforementioned sensor unit 100. The controller 250 is connected to power supply on/off means 220 for controlling on/off operation of the power supply voltage to be supplied to the sensor unit 100 from the power supply terminal 201 of the host device 200 and the power supply terminal 101 of the sensor unit 100 depending on the command and/or data to be transmitted to the sensor unit 100.

In the aforementioned particular construction, various data that the sensor unit requires is transmitted from the host device 200 to the sensor unit 100 as a serial data through the power supply terminals, 101, 201 prior to shipping or installation of the sensor unit 100 in an object to be detected. Based on such transmitted command and/or data, it is possible to write into or read out of the nonvolatile memory 120.

The host device 200 is properly connected to the sensor unit 100 not only in case of the aforementioned initialization but also when needed for maintenance or the like. In such case, the host device 200 communicate with the sensor unit as described hereinabove for acquiring necessary to specify or identify the sensor 110 installed in the sensor unit 100 such as, for example, the serial number, hours of operation, or the like by way of the current detection section 230 and the data detection section 240.

It is to be noted here that, when the sensor unit 100 is installed in a prescribed location in an object to be detected (for example, a passenger vehicle), required power supply voltage (for example, +5V) is supplied from included in such object through the power supply terminal 101. Then, the sensor unit 100 performs prescribed detection operation.

The sensor system 300 comprises the sensor unit 100 and the host device 200 having the aforementioned construction and operation. And the power supply terminal 101, the ground terminal 102 and the signal output terminal 103 of the sensor unit 100 are connected respectively to the power supply terminal 201, the ground terminal 202 and the signal output terminal 203 using, for example, a connection cable having an interconnection connector (not shown).

Now, a preferred embodiment of the sensor unit 100 according to the present invention will be described in greater details by reference to FIG. 2. FIG. 2 shows in details a preferred embodiment of a part of the sensor unit 100 including the data detection section 140 and the rectifier circuit 170.

Figure 2:
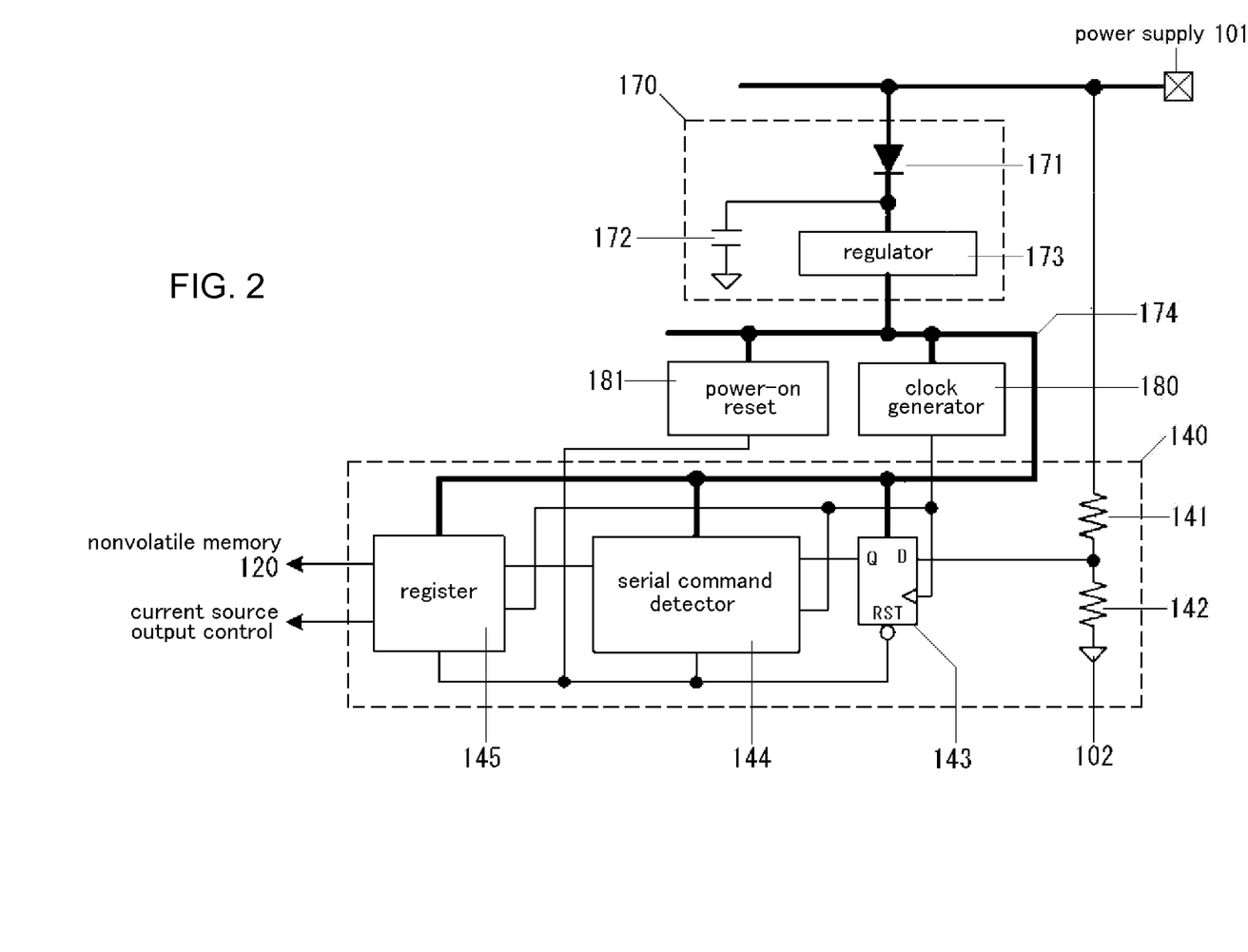
FIG. 2 shows detailed partial construction of a preferred embodiment of the sensor unit as shown in FIG. 1.

In FIG. 2, the data detection section 140 comprises a resistive divider 141, 142 connected between the power supply terminal 101 and the ground terminal 102, a D-type flip-flop circuit (DFF) 143, a serial command detector 144 and a register 145. n the other hand, the rectifier circuit 170 comprises the diode 171, the capacitor 172, and a regulator 173. An output voltage stabilized by the regulator 173 is outputted to the power supply bus 174. Also included in FIG. 2 are a clock generator or an oscillator (OSC) 180 and a power-on reset (POR) 181 required by the data detection section 140 for its proper operation. As will be described hereinafter, it is to be noted that the sensor unit 100 in FIG. 1 includes an OSC and POR similar to the OSC 180 and the POR 181 in the data detection section 140 for controlling the overall operation of the sensor unit 100.

The rectifier circuit 170 and the data detection section 140 as shown in FIG. 2 will be described. On/off pulsation of the power supply voltage to be supplied through the power supply terminal 101 from the host device 200 as an external device is rectified by the diode to charge the capacitor 172. Since the charged voltage across the capacitor 172 contains ripples, the regulator 173 operates to output more stabilized voltage to the power supply bus 174. The rectifier circuit 170 is necessary to provide operation power supply voltage for the data detection section 140 on the power supply bus 174 during transmission of command and/or data by pulsating the power supply voltage supplied through the power supply terminal 101, especially during off periods of the power supply voltage. This means that the capacitor 172 needs to have a small capacitance, for example, about 200 pF and such capacitor 172 can be fabricated integrally with the other components of the sensor unit 100 as an integrated circuit (IC).

The regulator 173 is a filter comprising, for example, a resistive divider and a capacitor. In the preferred embodiment of the present invention, if the normal operation voltage to be supplied through the power supply terminal 101 is +5V, the regulator 173 outputs, for example, stabilized about +2V to the power supply bus 174. The current source 160 may be formed with an electronic switch and a suitable resistor (for example, 1KΩ) connected between the power supply terminal 101 and the ground terminal 102. It is to be specially noted that the use of the rectifier circuit 170 including the regulator 173 enables to send command and/or data from the outside (host device 200) to the sensor unit 100 despite on/off pulsation of the power supply voltage to be supplied from the outside through the power supply terminal 101.

Now, detailed description will be made on construction and operation of the data detection section 140 as shown in FIG. 2. The voltage on the power supply terminal 101 is divided to a suitable voltage level by the resistive divider 141, 142 for inputting to the D terminal of the DFF 143. A clock signal from the OSC 180 is inputted to the clock terminal of the DFF 143, while a reset signal from the POR 181 is inputted to the reset (RST) terminal. An output signal on the Q output terminal of the DFF 143, the clock signal from the OSC 180 and the reset signal from the RST 181 are inputted to a serial command detector 144. And the output from the serial command detection section 144, the clock signal from the OSC 180 and the reset signal from the POR 181 are inputted to the register 145.

When the data detection section 140 having the construction as shown in FIG. 2 detects pulsation of the power supply voltage supplied through the power supply terminal 101, it is divided to suitable amplitude before being detected by the DFF 143. And command and/or data transmitted from an external device or the host device 200 is detected by the serial command detector 144 in response to the clock signal from the OSC 180. It is preferable that the data detection by the serial command detector 144 is made by making judgment of the pulse width of the pulsating power supply voltage. Command and/or data detected by the serial command detector 144 is sequentially inputted to the register 145. Detected data is written (or stored) in the nonvolatile memory 120 or data stored in specified address of such memory is modified or erased depending on the content of the command. The DFF 143, the serial command detector 144 and the register 145 are reset by the reset signal from the POR 181 in case of power-on of the external device. It is to be noted that the basis of judgment of the on/off time periods (pulse width) of the power supply voltage corresponding to [0] and [1] of the command and/or data to be transmitted is preferably sent from the host device 200 to the sensor unit 100 in advance. A typical example of the basis of judgment is 150 microseconds (μs) for the pulse width (i.e., off time) of the on/off pulsating power supply voltage and actual examples of the pulse widths for [0] and [1] are 100 μS and 200 μS, respectively. In this way, command and/data can be transmitted correctly from the host device 200 to the sensor unit 100.

Figure 3:
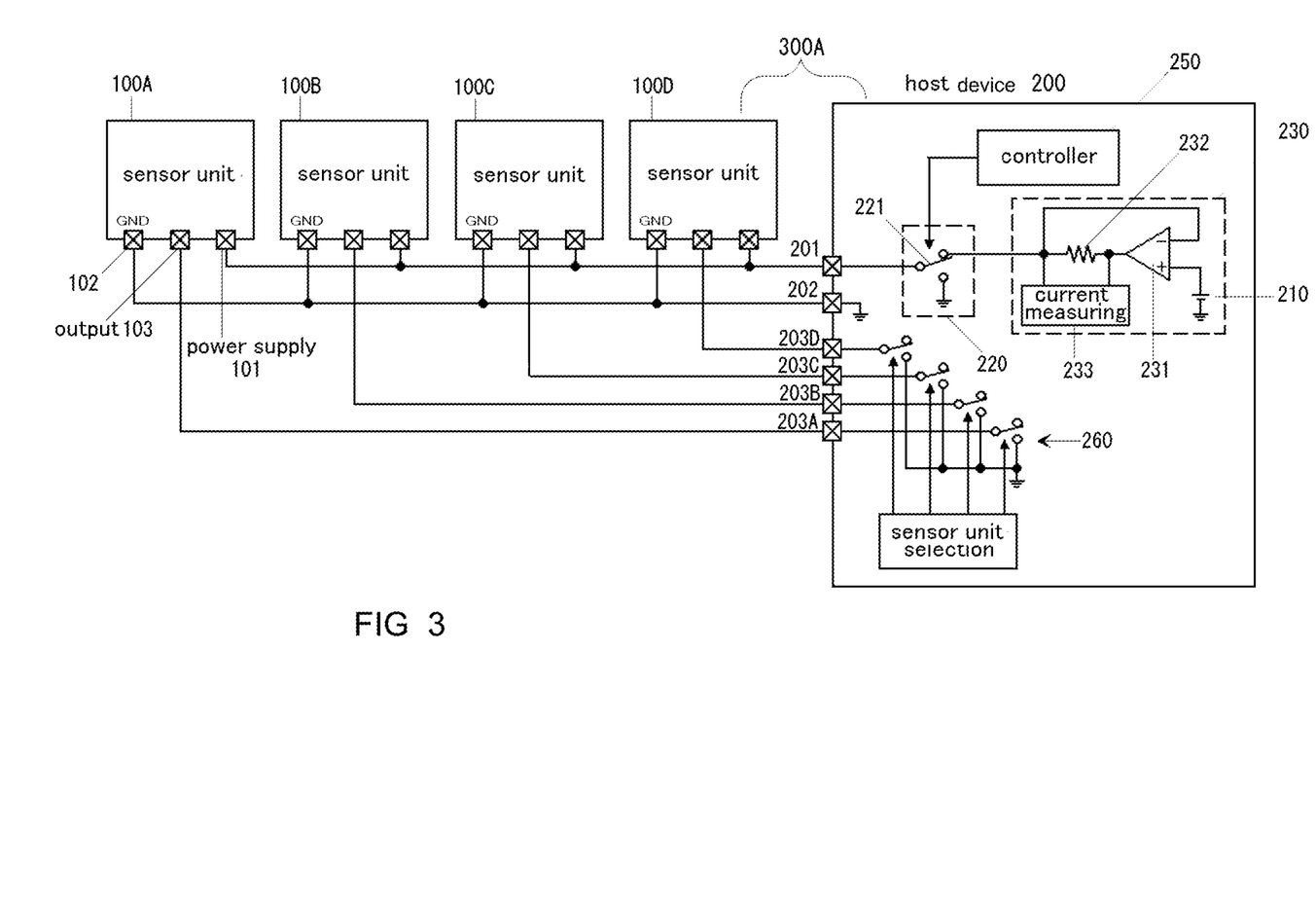
FIG. 3 is a block diagram of the sensor system of the present invention that enables to simultaneously connect a plurality of sensor units to the host device.

Now, FIG. 3 shows another embodiment of the sensor system according to the present invention. The sensor system 300A as shown in FIG. 3 is similar to the sensor system 300 as shown in FIG. 1 but differs in that the sensor system 300A comprises the host device 200 and plural sensor units 100A~100D. Each sensor unit 100A~100D may be the same as the sensor unit 100 as described hereinabove by reference to FIG. 1 and FIG. 2. For convenience of description, parts of constituent elements of the host device 200 are shown in greater details, while eliminating the remaining elements.

Each sensor unit 100A~100D is designed as a three-terminal structure having the power supply terminal 101, the ground terminal 102 and the signal output terminal 103. And the power supply terminals of all of the sensor units 100A~100D are commonly connected to the power supply terminal 201 of the host device 200. Similarly, all ground terminals 102 of the sensor units 100A~100D are commonly connected to the ground terminal 202 of the host device 200. On the other hand, the signal output terminals 103 of the sensor units 100A~100D are respectively connected to a plurality of signal output terminals 203A~203D of the host device 200.

The power supply of the host device 200 in FIG. 3 is represented by a battery 210. The current sensing section 230 comprises an operational amplifier 231, a current sensing resister 232 and a current measuring section 233. And power supply on/off means 220 is represented by a switch 221 that is on/off controlled by the controller 250.

The power supply 210 is connected to a non-inverting input terminal of the operational amplifier 231, and the current sensing resistor 232 having a suitable low resistance is connected in series with the output terminal of the operational amplifier 231. The inverting input terminal of the operational amplifier 231 is connected to the output end of the current sensing resistor 232, i.e., the remote end from the output terminal of the operational amplifier 231. Any voltage drop across the current sensing resistor 232, i.e., the voltage between both ends of such resistor is measured by the current measuring section 233.

In the preferred embodiment, the terminal voltage of the battery 210 is 5V and such voltage appears on the output end of the current sensing resistor 232. In the particular example, the current sensing resistor 232 has resistance of 150Ω and there causes about 375 mV voltage drop across the current sensing resistor 232 under normal operation. Such voltage drop varies (or fluctuates) depending on the load current of the sensor unit 100. The switch 221 constituting the power supply on/off means 220 is designed to output the normal operation voltage (for example, +5V) to the sensor units 100A~100D through the power supply terminals 201, 101 during its normal operation. However, when the movable switch contact of the switch 221 is connected to the ground position by the output of the controller 250, the power supply terminals 101, 201 goes to a ground potential, thereby pulsating the power supply voltage on the power supply terminals 101, 201 (for example, between +5V and 0V).

Sensor unit selection means 260 connected to the signal output terminals 203A~203D of the host device 200 selects either one (for example, 100A) of the plurality of sensor units 100A~100D. And the outputs of the remaining sensor units (for example, 100B~100D) are grounded. Selection operation of such sensor unit selection means 260 enables to sequentially select the plurality of sensor units 100A~100D connected to the host device 200 in a predetermined sequence for efficiently performing aforementioned initialization or the like.

Figure 4:
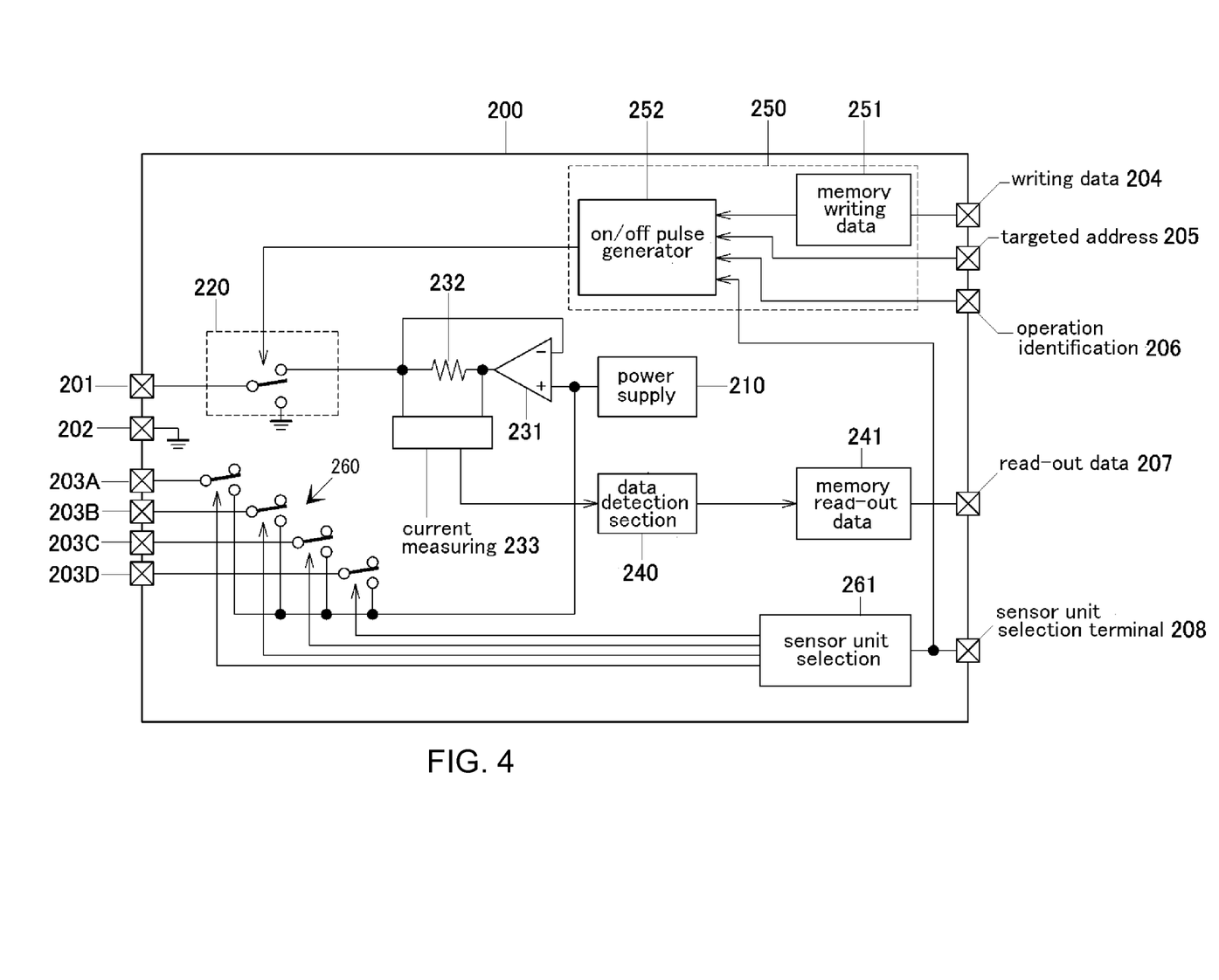
FIG. 4 shows details of a preferred embodiment of the host device of the present invention.

Now, reference is be made to FIG. 4 in order to describe in detail the preferred embodiment of the host device 200 constituting the sensor system as shown in FIG. 1 and FIG. 3. It is to be noted that the following description is focused primarily on the difference from the host device as shown in FIG. 1 and FIG. 3. In addition to the power supply terminal 201, the ground terminal 202 and four signal output terminals 203A~203D, the host device 200 is provided with writing data input terminal 204, a targeted address terminal 205, an operation identification terminal 206, a reading data terminal 207 and a sensor unit selection terminal 208.

The controller 250 for controlling the operation of power supply on/off means 220 is provided with memory writing data 251 and an on/off pulse generator 252. There is provided with memory readout data 241 for outputting the data detected by the data detector 240 to the data readout terminal 207. Sensor unit selection means 260 is provided with switches connected to signal output terminals 203A~203D. Each switch of sensor unit selection means 260 is selectively controlled by a signal from a sensor unit selector 261 connected to the sensor unit selection terminal 208. Data from the writing data input terminal 204 is inputted to the memory writing data 251. Inputted to the on/off pulse generator 252 are output data from the memory writing data 251, address data from the targeted address terminal 205, operation designation data from the operation designation terminal 206 and sensor unit selection data from the sensor unit selection terminal. Data from the writing data input terminal 204, the targeted address terminal 205, the operation designation terminal 206 and the sensor unit selection terminal 208 can be entered by an operator through suitable data entry means (for example, keyboard or the like). Data from a selected sensor unit 100 that is read out of the readout data terminal 207 may be displayed on suitable display means or the like for the purpose of interface with the operator.

Also connected to the switches of sensor unit selection means 260 is an output terminal of the power supply 210. By applying power supply voltage to the signal output terminal 203, it is possible to select any desired sensor unit (for example, 100A) out of the plurality of sensor units 100A~100D. In other words, there are two ways of selecting the sensor units 100A~100D; one is to designate by identification data (ID) in the pulse train and the other is to shunt the output terminal of any desired sensor unit to the power supply voltage (i.e., to apply the power supply voltage). The latter way does not use ID saved in the nonvolatile memory in the sensor unit 100. For example, in case of designating the ID after installation of the sensor units, it is effective that the output terminal is shunt to the power supply for designating a particular sensor unit and then writing the ID into the nonvolatile memory 120 using the aforementioned power supply line communication.

Figure 5A:
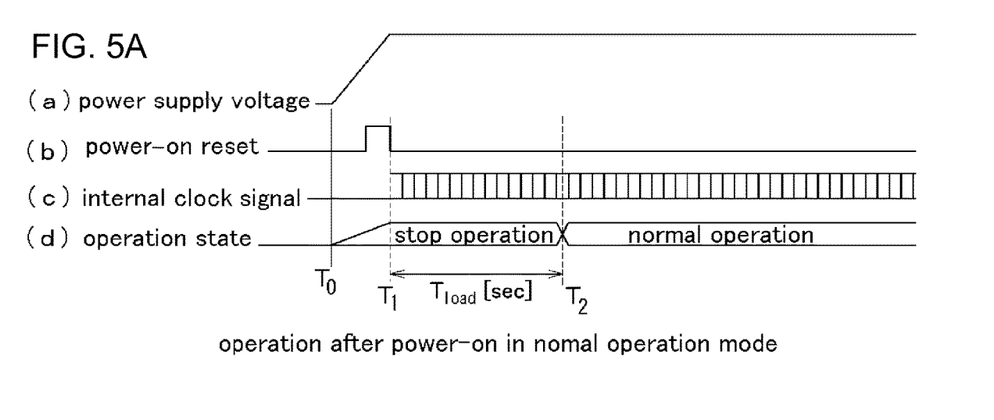
FIG. 5A shows the operation after power-on in the normal operation mode.
Figure 5B:
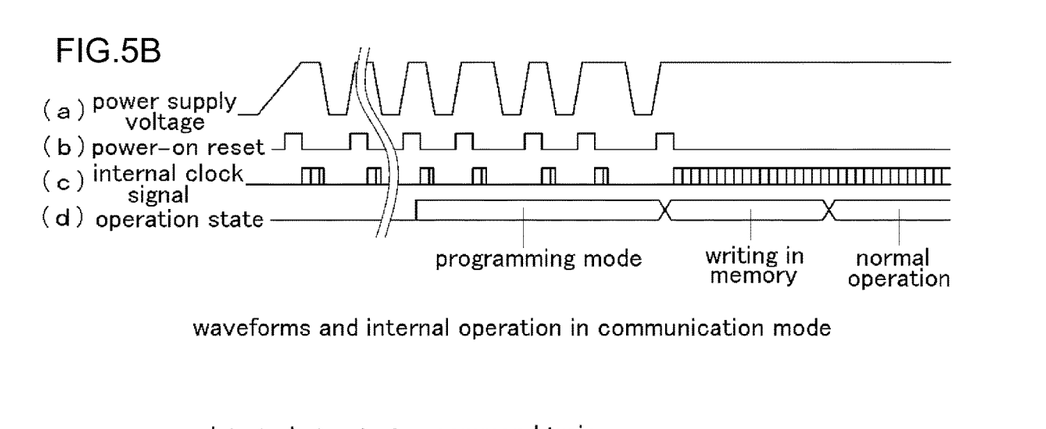
FIG. 5B shows power-on waveform and internal operation in the communication mode and FIG. 5C shows an example of a single frame data in the communication mode.
Figure 5C:
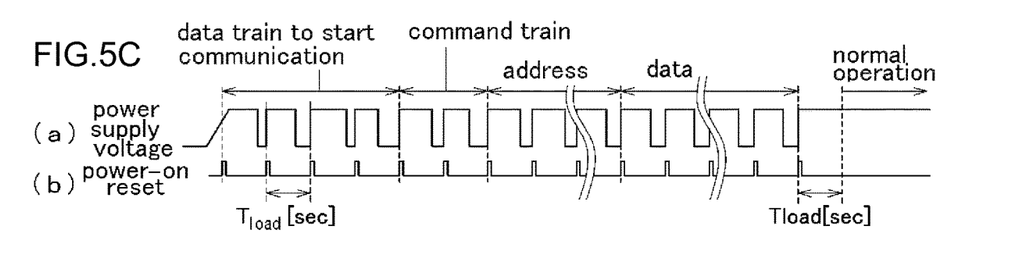

Now, operation of the sensor system 300 of the present invention will be described further in detail by reference to FIG. 5. FIG. 5A is a timing chart to illustrate the operation in the normal operation mode after power-on. FIG. 5B is a timing chart to illustrate a power-on waveform and internal operation in the communication mode. And FIG. 5C is a timing chart to illustrate an example of a single frame data train in the communication mode.

In FIG. 5A, (a) is the power supply voltage to be applied to the power supply terminal 101, (b) is a power-on reset signal from the POR 181 as shown in FIG. 2, (c) is an internal clock signal outputted from the OSC 180 as shown in FIG. 2 and (d) is a state diagram to illustrate operation of the sensor unit 100.

As understood from the timing chart in FIG. 5A, when the power supply voltage is applied at time $T_0$, it takes a certain time before reaching a predetermined voltage. In order to avoid unstable operation during such time period, the power-on reset signal is generated at time $T_1$, thereby interrupting operation for a predetermined time $T_{load}$. Such interruption time can be set to any desired value by counting the clock signal from the OSC 180 using a timer (not shown) that is incorporated within the unit. In a preferred embodiment, such time is set to, for example, 1 millisecond (mS). At time T2, when the power supply voltage has been stabilized, the sensor unit 100 is switched to the normal operation mode.

Then, reference is made to FIG. 5B to continue the description. In FIG. 5B, (a) is the power supply voltage to be applied to the power supply terminal 101, (b) is the power-on reset signal from the POR 181, (c) is the internal clock signal outputted from the OSC 180 and (d) is a state diagram of the sensor unit 100.

As shown in the timing chart (a) in FIG. 5B, a command is sent by turning on/off the power supply voltage to be applied from the host device 200 to the power supply terminal 101 for plural times, thereby switching the sensor unit 100 to the communication mode. During the communication mode, transmitted is the data to write or replace in the nonvolatile memory 120. The data received by the sensor unit 100 is detected by the serial command detector 144 as shown in FIG. 2 and written in the register 145. The sensor unit 100 is switched to the normal operation mode by way of the writing operation period to write the data in the register 145 at predetermined address in the nonvolatile memory 120. The power supply voltage to be applied to the power supply terminal 101 is constant (the normal operation voltage of, for example, +5V) during the time of writing the data into the nonvolatile memory 120 and in the normal operation mode.

Then, a reference is made to FIG. 5C to describe the operation in the communication mode. In FIG. 5C, (a) is the power supply voltage to be supplied to the power supply terminal 101 from the host device 200 and (b) is the power-on reset signal from the POR 181.

When the sensor unit 100 is in the communication mode as described hereinabove by reference to FIG. 5B, a single frame of transmission from the host device 200 to the sensor unit 100 consists of a communication start data train, an ID train, a command train, an address, a data and an end of frame. In the particular embodiment, the communication start train is to notify the start of communication from the host device 200 to the sensor unit 100 and is, for example, 4 bits. It is possible to improve accuracy of discriminating the data train from power supply noise by having plural 0V (power supply off) periods as the data train to notify the start of communication. The ID train is to designate the targeted sensor unit 100 and is, for example, 4 bits. The command train is, for example, 2 bits. that designate, for example, read-out, writing, erasing or other operation of the nonvolatile memory 120. The address is, for example, 8 bits. The data is, for example, 16 bits. And the data train to notify the end of frame is, for example, 4 bits.

Construction and operation of preferred embodiment of the sensor unit, the host device to cooperate therewith, the sensor system comprising such sensor unit and the host device as well as the communication method between sensor unit and host device have been described in detail hereinabove. However, it is to be noted that the embodiment is nothing but example of the present invention and is not for the purpose of restricting the invention. It is apparent for a person having an ordinary skill in the art that various modifications can be easily made without departing from the scope and sprit of the present invention. For example, the off time voltage of the on/off power supply to be supplied from the outside (host device) through the power supply terminal is not necessarily 0V so long as it is sufficiently lower than the normal operation voltage.

DESCRIPTION OF REFERENCE NUMERALS

100: sensor unit (sub-device)
101, 201: power supply terminal
102, 202: ground terminal
103, 203, 203A~203D: signal output terminal
110: sensor
112: calibration section
120: nonvolatile memory
130: controller
140, 240: data detection section
150: D/A converter
160: current source
170: rectifier circuit
200: host device (external device)
210: power supply
220: power supply on/off means
230: current detection section
250: controller
260: sensor unit selection means
300, 300A: sensor system

What is claimed is:

1. A 3-terminal IC sensor unit including a sensor and a calibration section for calibrating the output from the sensor and having a power supply terminal to which a power supply voltage is supplied from outside, a ground terminal and a signal output terminal, comprising:
  receiving means for receiving information sent from the outside by turning on/off the power supply voltage to be supplied to the power supply terminal;
  a rectifier circuit for obtaining operation voltage by rectifying and smoothing the on/off pulsating power supply voltage on the power supply terminal, enabling the 3-terminal IC sensor unit to operate despite on/off pulsation of the power supply voltage; and
  a current source for varying the load current of the power supply to be supplied to the power supply terminal from the outside for transmitting information to the outside.

2. A host device to be connected to the power supply terminal, the ground terminal and the signal output terminal of the sensor unit of claim 1 for performing initial set-up and maintenance of the sensor unit, comprising:

a power supply for supplying the operation power supply voltage to the sensor unit through the power supply terminal of the sensor unit;

power supply on/off means for turning on/off the power supply voltage to be supplied from the power supply to the power supply terminal in response to the information to be transmitted to the sensor unit; and data detection means for detecting the information to be transmitted from the sensor unit by detecting the change in the load current of the power supply flowing through the power supply terminal.

\* \* \* \* \*